(12) United States Patent
Khalid et al.

(10) Patent No.: US 7,079,872 B2
(45) Date of Patent: Jul. 18, 2006

(54) PORTABLE DEVICE HAVING ROTATABLE DISPLAY

(75) Inventors: Mohammad T. Khalid, Boca Raton, FL (US); Adrian P. Davis, Hallandale, FL (US); Gino V. Tozzi, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 66 days.

(21) Appl. No.: 10/689,488

(22) Filed: Oct. 20, 2003

(65) Prior Publication Data

US 2005/0085273 A1    Apr. 21, 2005

(51) Int. Cl.
*H04B 1/38* (2006.01)
*H04M 1/00* (2006.01)

(52) U.S. Cl. .............. 455/566; 455/575.1; 455/90.3; 455/550.1

(58) Field of Classification Search ............. 455/550.1, 455/566, 575.4, 575.1, 556.1, 556.2, 575.3, 455/90.3, 90.1
See application file for complete search history.

(56) References Cited

U.S. PATENT DOCUMENTS

| | | | |
|---|---|---|---|
| 6,519,483 B1 * | 2/2003 | Watanabe | 455/575.1 |
| 6,795,717 B1 * | 9/2004 | Price et al. | 455/566 |
| 6,829,490 B1 * | 12/2004 | Nakamura et al. | 455/550.1 |
| 2003/0114198 A1 * | 6/2003 | Han | 455/566 |
| 2003/0228847 A1 * | 12/2003 | Matsumoto | 455/90.3 |
| 2004/0058703 A1 * | 3/2004 | Eromaki et al. | 455/550.1 |
| 2004/0121825 A1 * | 6/2004 | Ma et al. | 455/575.4 |
| 2004/0192398 A1 * | 9/2004 | Zhu | 455/566 |
| 2004/0198474 A1 * | 10/2004 | Jung et al. | 455/575.1 |
| 2004/0203505 A1 * | 10/2004 | Newman et al. | 455/90.3 |
| 2004/0204059 A1 * | 10/2004 | Wong et al. | 455/556.1 |
| 2005/0113135 A1 * | 5/2005 | Goebel et al. | 455/556.1 |

* cited by examiner

*Primary Examiner*—Edward F. Urban
*Assistant Examiner*—John J. Lee
(74) *Attorney, Agent, or Firm*—Scott M. Garrett

(57) ABSTRACT

A multi-configuration electronic device has two body portions (102, 104) that move with respect to each other, and a single display module (108). As the device is reconfigured from an open position (100) to a closed position (400), the display module rotates so that it is viewable in either of those positions. The rotation may be performed by use of a belt (802), gear and axle (1000), or a combination of belt and gear and axle (1300). The display may rotate horizontally or vertically.

16 Claims, 8 Drawing Sheets

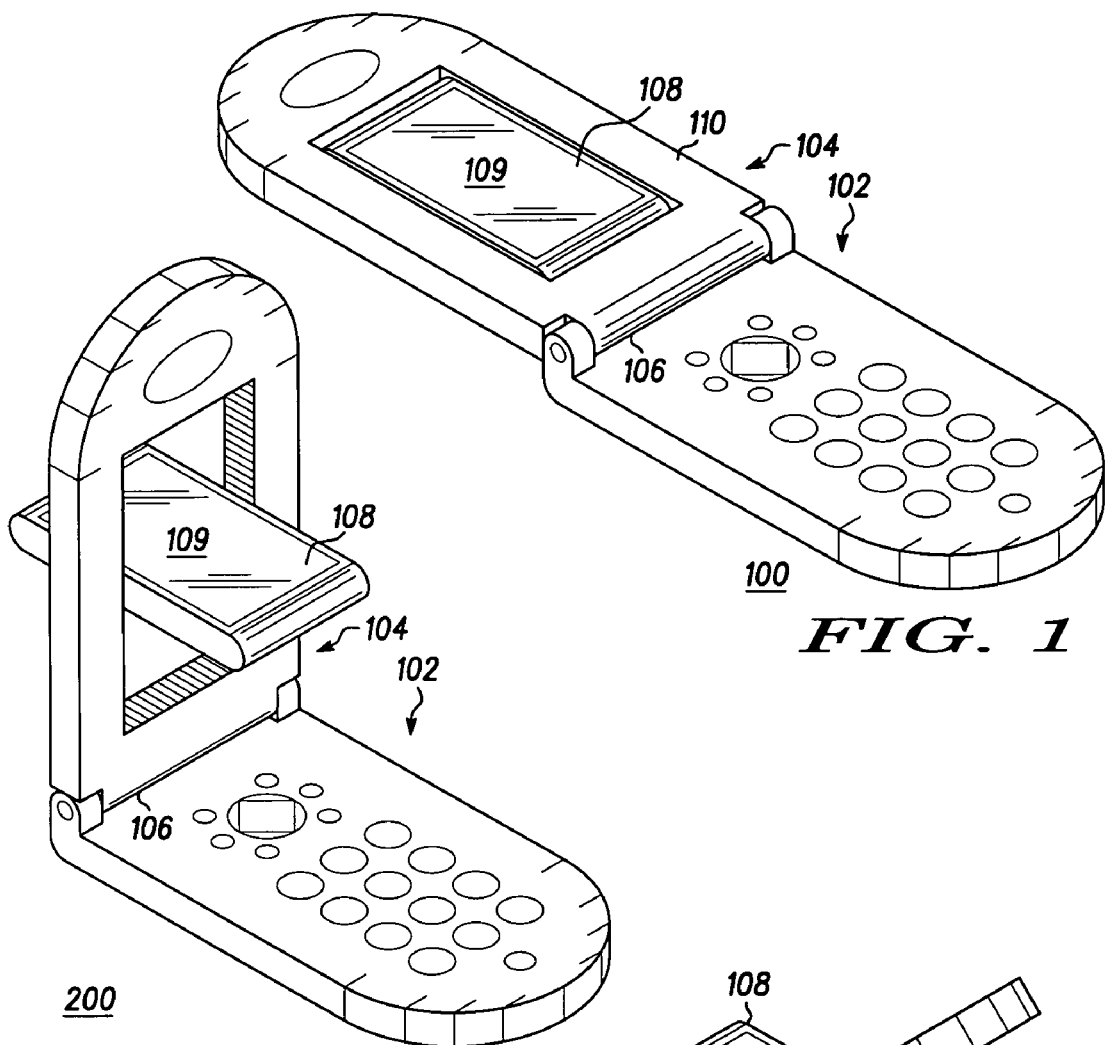
FIG. 1
FIG. 2
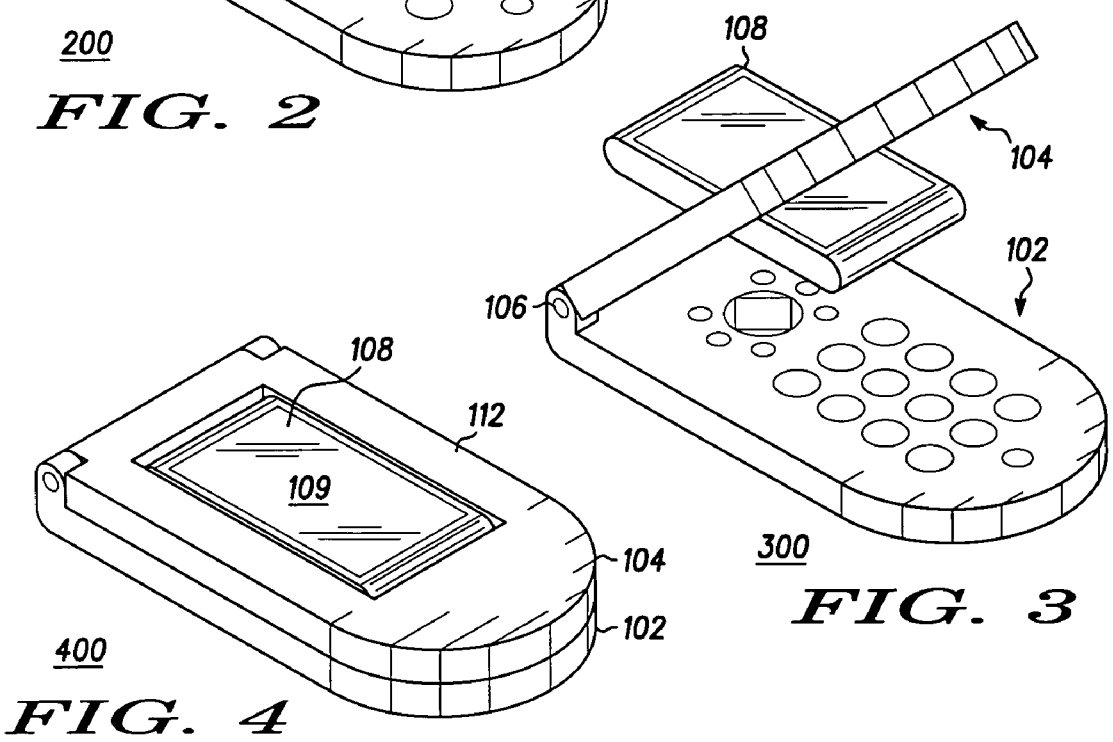
FIG. 3
FIG. 4

1200

PORTABLE DEVICE HAVING ROTATABLE DISPLAY

TECHNICAL FIELD

This invention relates in general to portable electronic devices that are configurable into multiple configurations and more particularly to multi-configuration devices that display information for use in the various configurations.

BACKGROUND OF THE INVENTION

Mobile communication devices are in widespread use, and are manufactured in a variety of form factors. One of the most popular form factors is a folding or "clamshell" design. The clamshell design has two major body segments connected by a hinge, and the two body segments rotate with respect to each other between an open position and a closed position. Typically one body segment contains a display for displaying information, and an earpiece speaker for playing received audio and voice signals, such as, for example, during calls. The other body segment contains a keypad and other buttons to allow the user to enter data and otherwise control the operation of the mobile communication device. Users typically keep the clamshell type mobile communication device closed until they wish to engage in a call, either upon answering a call or when initiating a call.

Clamshell mobile communication devices present some problems, however. For example, one service that is in widespread use is so called "caller ID" which allows a receiving mobile communication device to display the calling number and other information of the party calling the mobile communication device. However, with a typical clamshell mobile communication device. The user must open the mobile communication device to see the display and the caller ID information. Many users have expressed an interest in being able to see the caller ID information upon receiving a call alert without having to open the mobile communication device to view the display. Some users set their mobile communication device so that it automatically answers the call upon being opened.

One solution that has been implemented to solve this problem is the provide a second, smaller display on the outside of the clamshell so that when a call comes in the caller ID information can be displayed on the outside display, allowing the user to decide if it is a call that the user wants to answer at that moment. The problem with this approach is that it increases the cost of the mobile communication device by a significant amount, and may increase the thickness of the mobile communication device to accommodate the additional display. Typically the display is among the most expensive, if not the most expensive component in the mobile communication device. Therefore there is a need for a means by which a user can see the display while the clamshell mobile communication device is in the closed position without the additional cost of a second display.

BRIEF DESCRIPTION OF THE DRAWINGS

FIG. 1 shows a first isometric view of a multi-configuration electronic device having a rotating display, in accordance with the invention, in a fully open position;

FIG. 2 show a second isometric view of a multi-configuration electronic device having a rotating display, in accordance with the invention, in a partially closed position;

FIG. 3 shows a third isometric view of a multi-configuration electronic device having a rotating display, in accordance with the invention, in a partially open position;

FIG. 4 shows a fourth isometric view of a multi-configuration electronic device having a rotating display, in accordance with the invention, in a fully closed position;

DETAILED DESCRIPTION OF A PREFERRED EMBODIMENT

Figure 5:
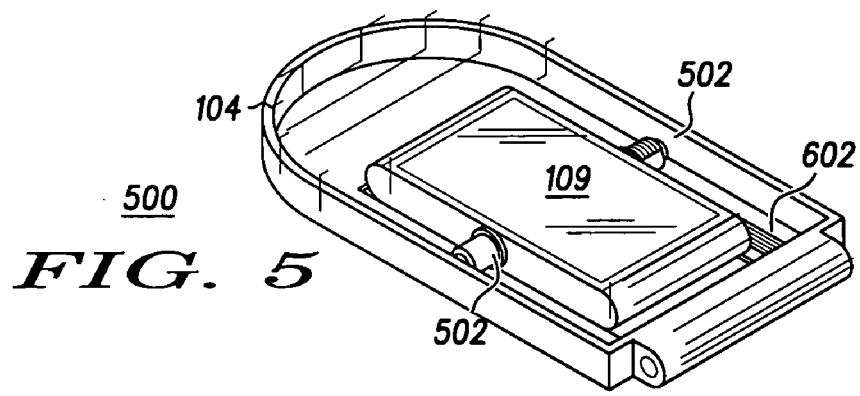
FIG. 5 shows an assembly view of a rotatable display for a multi-configuration electronic device, in accordance with one aspect of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of the user not being able to see displayed information without a second display element on the outside of the clamshell type multi-configuration electronic device, such as a mobile communication device or personal digital assistant (PDA), by using a single display that rotates in response to the device being opened or closed, so that the display can be seen in either the open or closed position. The invention further provides various means for rotating the display, such as, for example, a belt, or gear and axle assemblies. The invention further provides rotation of the display along a horizontal axis or a vertical axis. The invention still further provides a limited slip in a belt system for rotating the display so as to ensure complete rotation of the display.

Referring now to FIG. 1, there is shown a first isometric view of a multi-configuration electronic device 100 having a rotating display module 108, in accordance with the invention, in a fully open position. The device comprises a first body portion 104 and a second body portion 102. The two body portions are hingeably connected by a hinge 106 so that they may rotate about an axis of the hinge with respect to each other, as is well known in the art. The second body portion may contain, for example, circuit boards, keypad and other buttons for controlling the device, and so on. The device may be, for example, a folding mobile communication device. The display has viewing surface 109 that is aligned with an inside surface 110 when the device is opened.

In FIGS. 2–4, there is shown the multi-configuration electronic device in a partially closed position 200, partially open position 300, and fully closed position 400, respectively. Together with FIG. 1, these illustrations show a sequence of closing the device. In FIG. 1, the display is visible to the user and appears on an inside portion of the first body portion. As the first body portion is rotated towards the second body portion, and when the user is closing the device, the display module rotates, as illustrated in FIGS. 2–3 until the device is closed, whereupon the display is now visible to the user on the outside of the first body portion. As shown in these figures, the display module rotates about a horizontal axis with respect to the device, and it rotates automatically so that it can be seen in either the open or closed position. When the device is closed, the viewing surface 109 is aligned with an outside surface 112 of the first portion 104 of the device.

Figure 6:
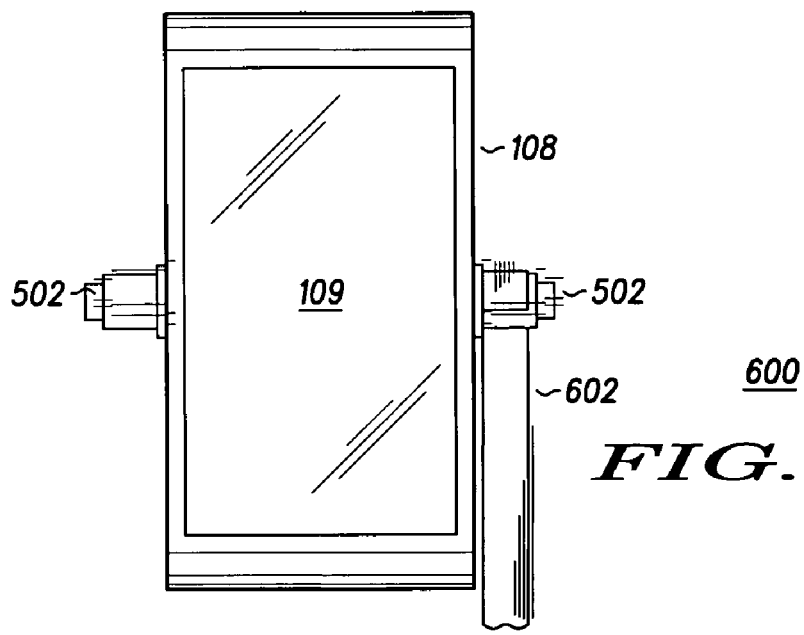
FIG. 6 shows a display module for use in a multi-configuration electronic device in accordance with one aspect of the invention.
Figure 7:
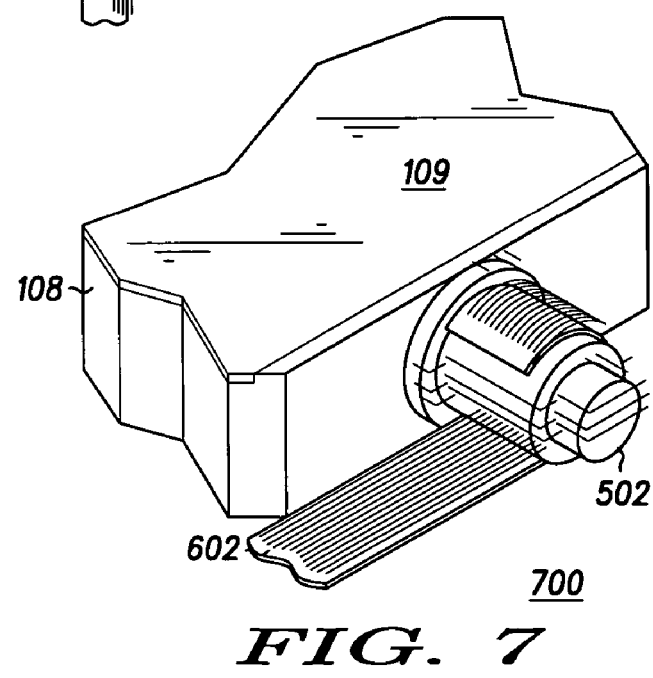
FIG. 7 shows a detail of a flexible circuit routing for a display module in accordance with one aspect of the invention.

Referring now to FIG. 5, there is shown an assembly view 500 of a rotatable display module 108 for a multi-configuration electronic device, in accordance with one aspect of the invention. The display module is shown seated in the first body portion 104. The display module includes a display element, such as a liquid crystal display, for example. The display element displays information according to electric signals provided to it from a driver circuit, as is known in the art. The display module is supported by a pair of axial bosses 502 which define the axis about which the display module rotates. In FIG. 6 the display module 108 is shown by itself (600). To provide the electric signals to the display, a flexible circuit board 602 is connected to the display through one of the axial bosses 502. If FIG. 7 an isometric detail view 700 of the display shows the flexible circuit board 602 wrapping around the axial boss 502. A portion of the flexible circuit board passes into the axial boss and to the display element to provide power and information signals to the display element. The flexible circuit board connects the display element to a driver circuit, which is preferably located in the second body portion, as is common in the art.

Thus the display module 108 is rotatably mounted in the first body portion of the multi-configuration electronic device. The display module rotates about a pair of axial bosses which support the display module, including the display element, and allow access to the display element for electrical signals so that information may be displayed on the display element. The rotation of the display module depends on the movement of the first and second body portions with respect to each other so that the display is viewable by a user of the device when the device is in an open position, and also when the device is in a closed position. There are a variety of means for causing rotation of the display module in conjunction with movement of the body portions.

Figure 8:
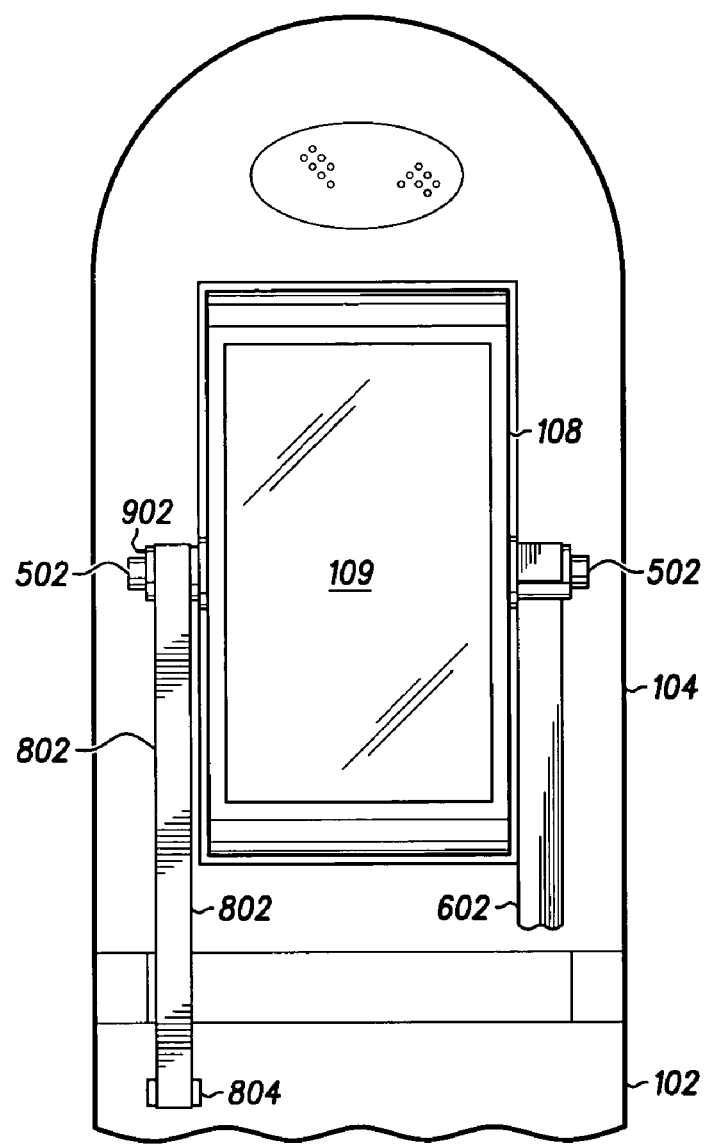
FIG. 8 shows an assembly drawing of a rotatable display module for use in a multi-configuration electronic device, in accordance with one embodiment of the invention.

Referring now to FIG. 8, there is shown an assembly drawing 800 of a rotatable display module for use in a multi-configuration electronic device, in accordance with one embodiment of the invention. In one embodiment the means for causing rotation of the display module includes a small belt 802 linked between the first and second body portions. Preferably the belt is mounted over one of the axial bosses 502 and a fixed stanchion 804 in the second body portion. Both the axial boss 502 and stanchion 804 are preferably grooved and the belt is seated in the grooves. The diameters of the axial boss and stanchion determine the amount of rotation of the display module. As the first and second body portions are moved with respect to each other, the belt, by virtue of the stanchion being fixed, causes the display module to rotate. It is left as a matter of engineering choice to determine the relative diameters of the axial boss and stanchion for the desired amount of rotation for a given application. In the preferred embodiment the belt is tight enough to ensure rotation, but not so tight as to keep the belt from slipping if the display module is prevented from moving. So designed, the diameters of the axial boss and stanchion may be selected so that there would normally be a slight over-rotation of the display module, but a stopping feature can be provided to stop rotation of the display module at the desired positions.

Figure 9:
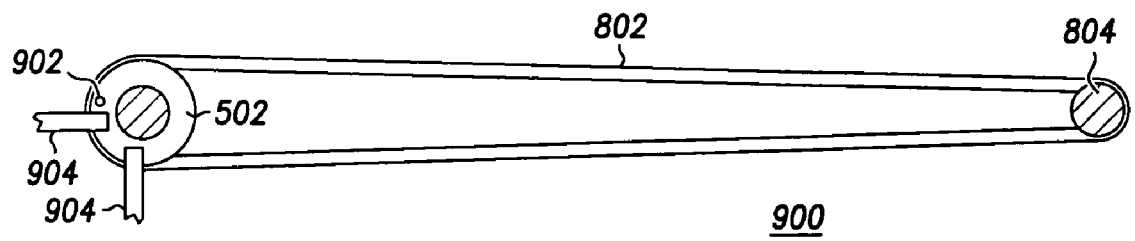
FIG. 9 shows a detail of a mechanism for rotating a display module in accordance with one embodiment of the invention.

Referring now to FIG. 9, there is shown a detail view 900 of a mechanism for rotating a display module in accordance with one embodiment of the invention. Here can be seen the axial boss 502, which is coupled to the display module in the first body portion of the multi-configuration electronic device, and the stanchion 804 which is mounted in the second body portion and is fixed in place. Between the axial boss and stanchion is a belt 802 linking the first and second body portions. In the preferred embodiment the diameters of the axial boss and stanchion where the belt is mounted is such that there would normally be a slight over-rotation of the display module. However, the belt is tensioned such that it will slip as the first and second body portions are moved and the display module is prevented from rotating, and in the preferred embodiment stopping features are used to stop rotation of the display module when the device is fully open or fully closed. In one embodiment the stopping features include a protrusion 902 extending from the axial boss 502. A pair of stopping walls 904 are provided in the first body portion to stop rotation of the display module at the desired positions by interfering with the protrusion 902. As the display module rotates to a terminal position, i.e. when the device is almost fully open or almost fully closed, the protrusion makes contact with one of the stopping walls 904. At that time the display module is in the correct position, and as the device is moved into either the fully closed or fully open position the belt 802 slips over the axial boss, or stanchion 804, or both. Thus, proper position of the display module is assured despite variation in diameters of the axial boss and stanchion, as well as length of the belt 802, during manufacturing. Furthermore, this arrangement accounts for lengthening of the belt over use of the device as the device ages.

A variety of other mechanisms exist that can cause rotation of the display module as the device is opened or closed, including, for example, electromechanical motor assemblies controlled by sensors which detect movement of the body portions of the device with respect to each other. However, simple passive mechanical mechanisms will proved the most cost effective means of causing rotation of the display module. In addition to the belt mechanism, it is contemplated that a gear and axle mechanism may be employed to cause rotation of the display module.

Figure 10:
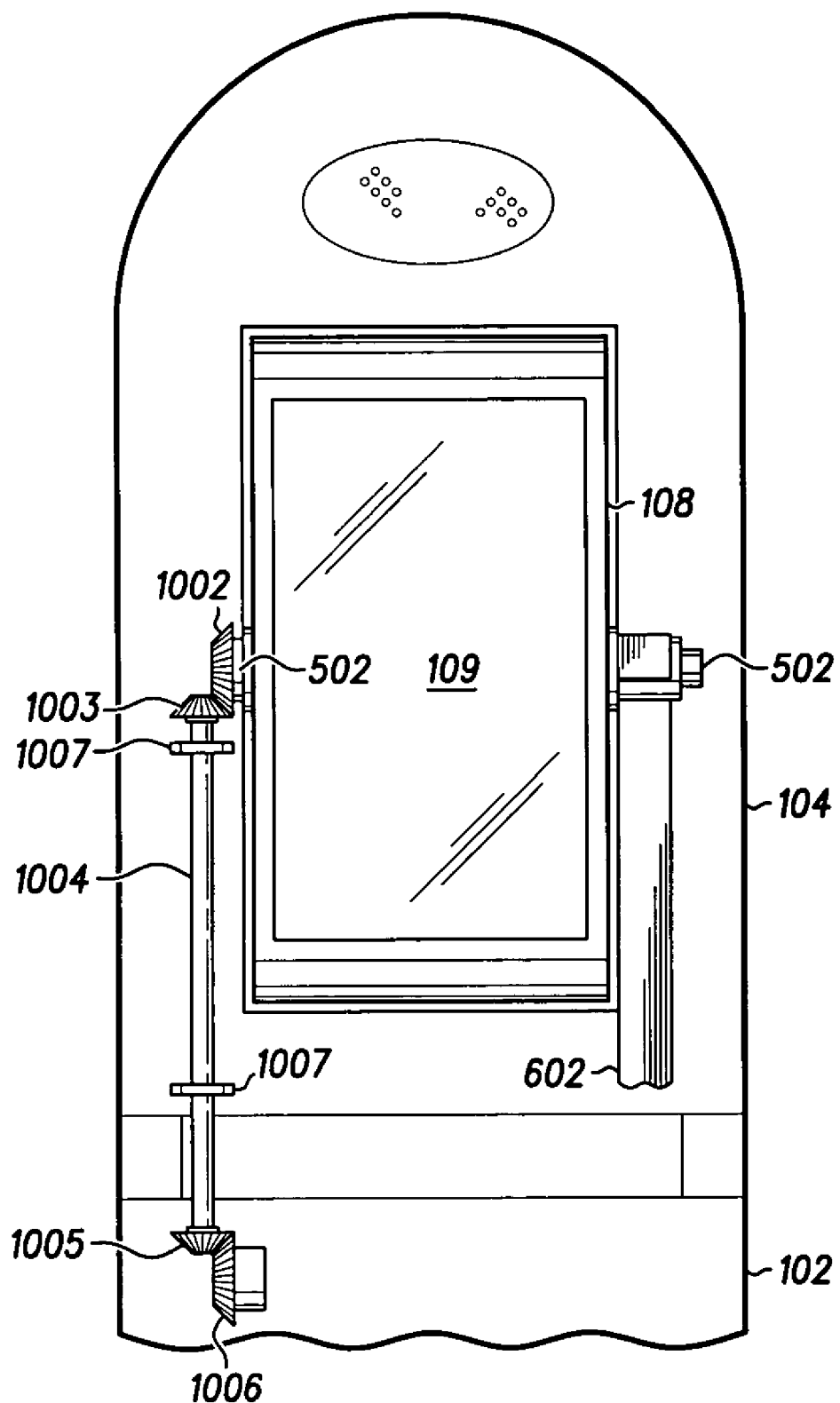
FIG. 10 shows an assembly drawing of a rotatable display module for use in a multi-configuration electronic device, in accordance with one embodiment of the invention.

Referring now to FIG. 10, there is shown an assembly view 1000 of a rotatable display module for use in a multi-configuration electronic device, in accordance with one embodiment of the invention. In particular here a gear and axle mechanism for rotating the display module is shown. A boss gear 1002 is fixed upon the axial boss 502. The boss gear intermeshes with a first gear 1003 mounted on a transfer axle 1004. A second gear 1005 mounted on the opposite end of the transfer axle intermeshes with a fixed gear 1006 which is fixably mounted in the second body portion. That is, the fixed gear does not move. The transfer axle is held in place by, for example, guide features 1007 disposed in the first body portion. Thus, as the first and second body portions are moved with respect to each other, the transfer axle rotates due to the fact that the fixed gear does not move, and therefore the transfer axle must rotate as in moves along the fixed gear. This rotation is likewise imparted to the display module by the transfer axle via the boss gear. The gear ratios may be selected to ensure the desired range of rotation of the display module.

To ensure proper positioning of the display upon rotation, the gear assembly may be designed for slight over-rotation, as described in association with the belt drive assembly in FIG. 8. To allow the gears to slip, the transfer axle 1004 may be spring mounted in the guide features. That is, the transfer axle is normally biased into position to engage the boss gear 1002 and fixed gear 1006, but when the display reaches a terminal position (fully open or fully closed) the transfer axel may be moved away from the gears momentarily as the gears slip past each other. The spring mounting may be achieved either by actually mounting springs in the guides, or by designing the transfer axle to deflect in a cantilevered fashion. It is further contemplated that a clutch action may be used. In an embodiment using a clutch, a slip mechanism would be placed in the linkage between the boss and the fixed gear. It is contemplated that rather than using a boss gear, a flat surface may be used and instead of the first gear 1003, and roller may be used with slips on the surface upon complete rotation of the display. Similarly, the transfer axle may be two halves, and a slip clutch mating the two halves to allow on half to rotate when the other half stops because the display has reached a terminal position.

Figure 11:
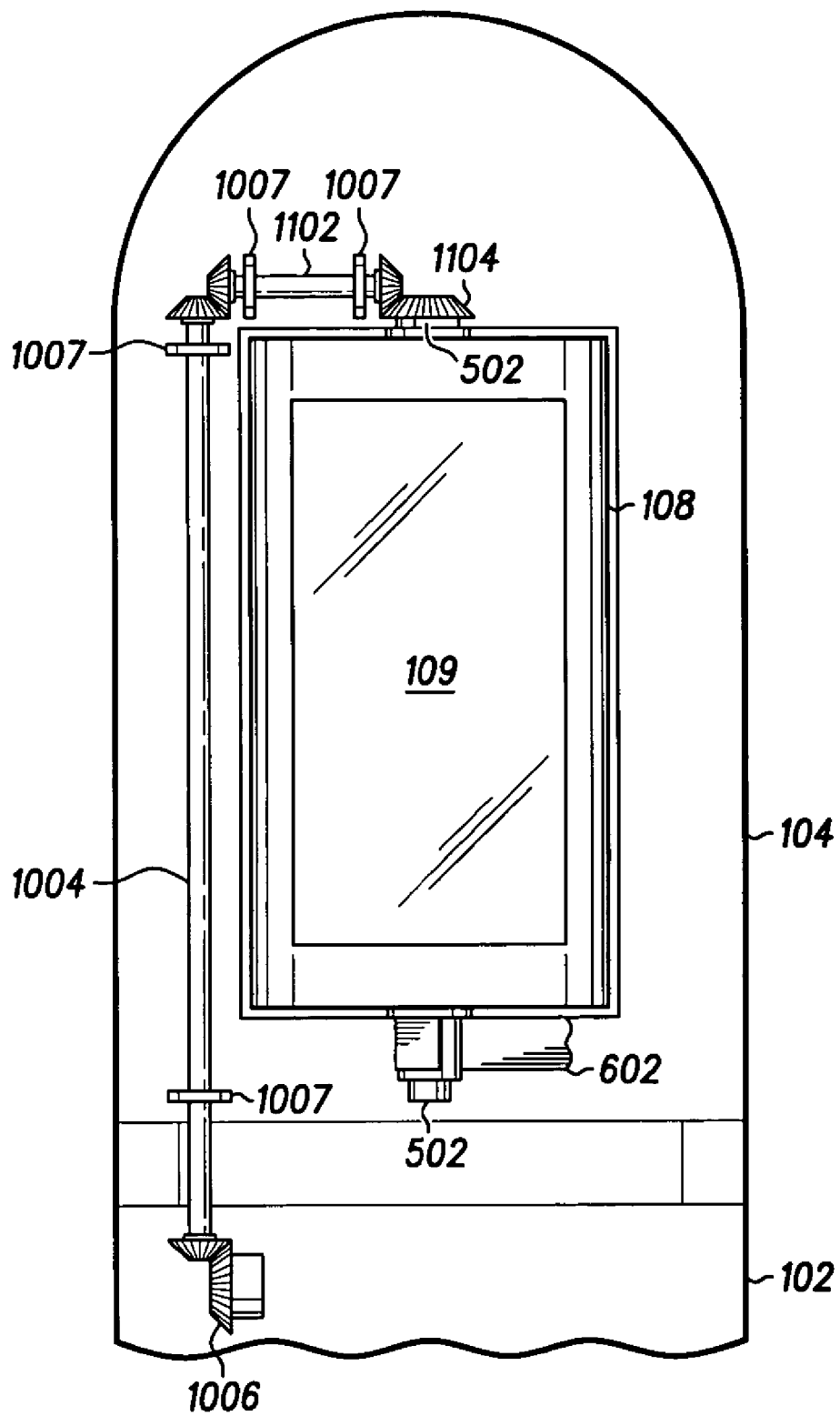
FIG. 11 shows an assembly drawing of a rotatable display module for use in a multi-configuration electronic device, in accordance with one embodiment of the invention.
Figure 12:
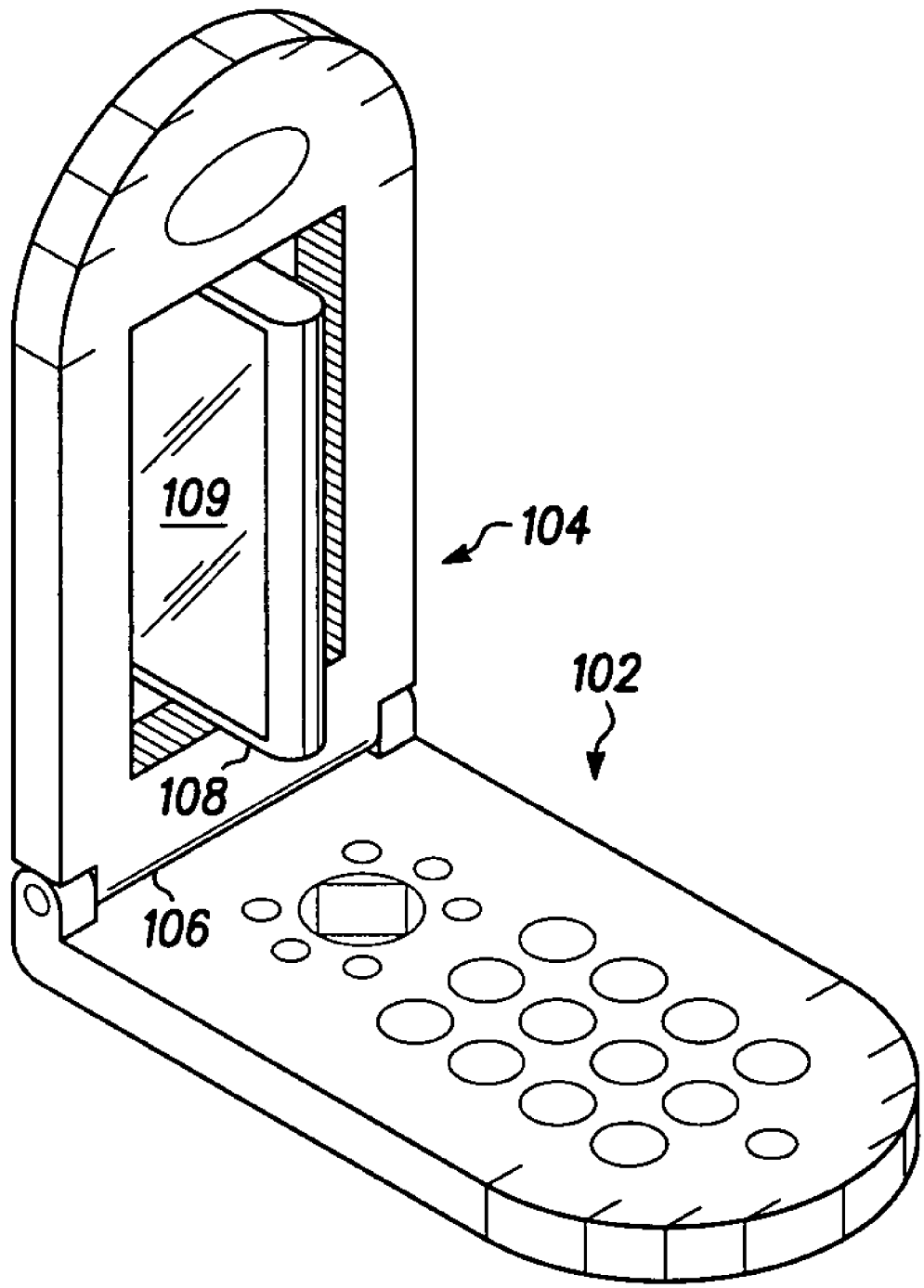
FIG. 12 shows an isometric view of a multi-configuration electronic device having a rotating display, in accordance with one embodiment of the invention.

Thus far only horizontal rotation of the display module has been discussed. It is also contemplated that the display module may rotate about a vertical axis. Referring now to FIG. 11, there is shown an assembly view 1100 of a rotatable display module for use in a multi-configuration electronic device, in accordance with one embodiment of the invention. To provide vertical rotation, a gear and axle assembly similar to that shown in FIG. 10 is employed, with the addition of a second transfer axle 1102 that intermeshes with the first transfer axle 1004. The second transfer axle also intermeshes with a top boss gear 1104. Thus, as the first and second body portions are moved with respect to each other the display module rotates about a vertical axis, as shown in FIG. 12 where the device is shown midway between the fully open and fully closed positions (1200) with the display module at midway in its rotation.

Figure 13:
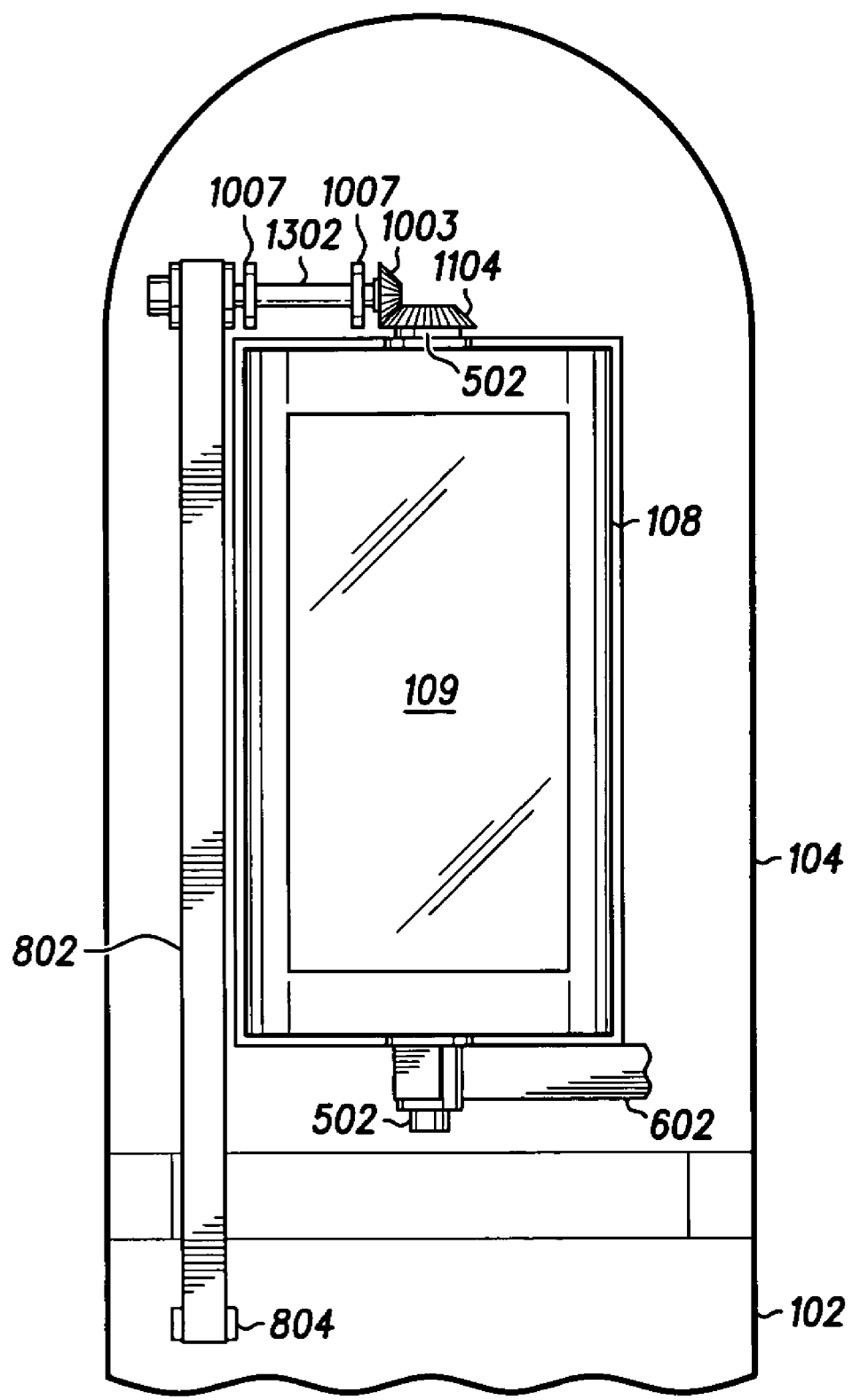
FIG. 13 shows an assembly drawing of a rotatable display module for use in a multi-configuration electronic device, in accordance with one embodiment of the invention.

Although gear and axle assemblies provide the necessary rotation of the display module, in some applications the built in slip associated with the belt mechanism of FIGS. 8–9 may be combined with a gear and axle assembly as shown in FIG. 13. In FIG. 13 there is shown an assembly view 1300 of a rotatable display module for use in a multi-configuration electronic device, in accordance with one embodiment of the invention. Here a belt 802 links the first and second body portions as before. However, rather than linking to the axial boss, the belt links to a dual type transfer axle 1302 which has a belt guide on one end on which the belt is mounted, and a transfer gear 1003 at the other end which intermeshes with a boss gear 1104 which is fixed to the display module.

Figure 14:
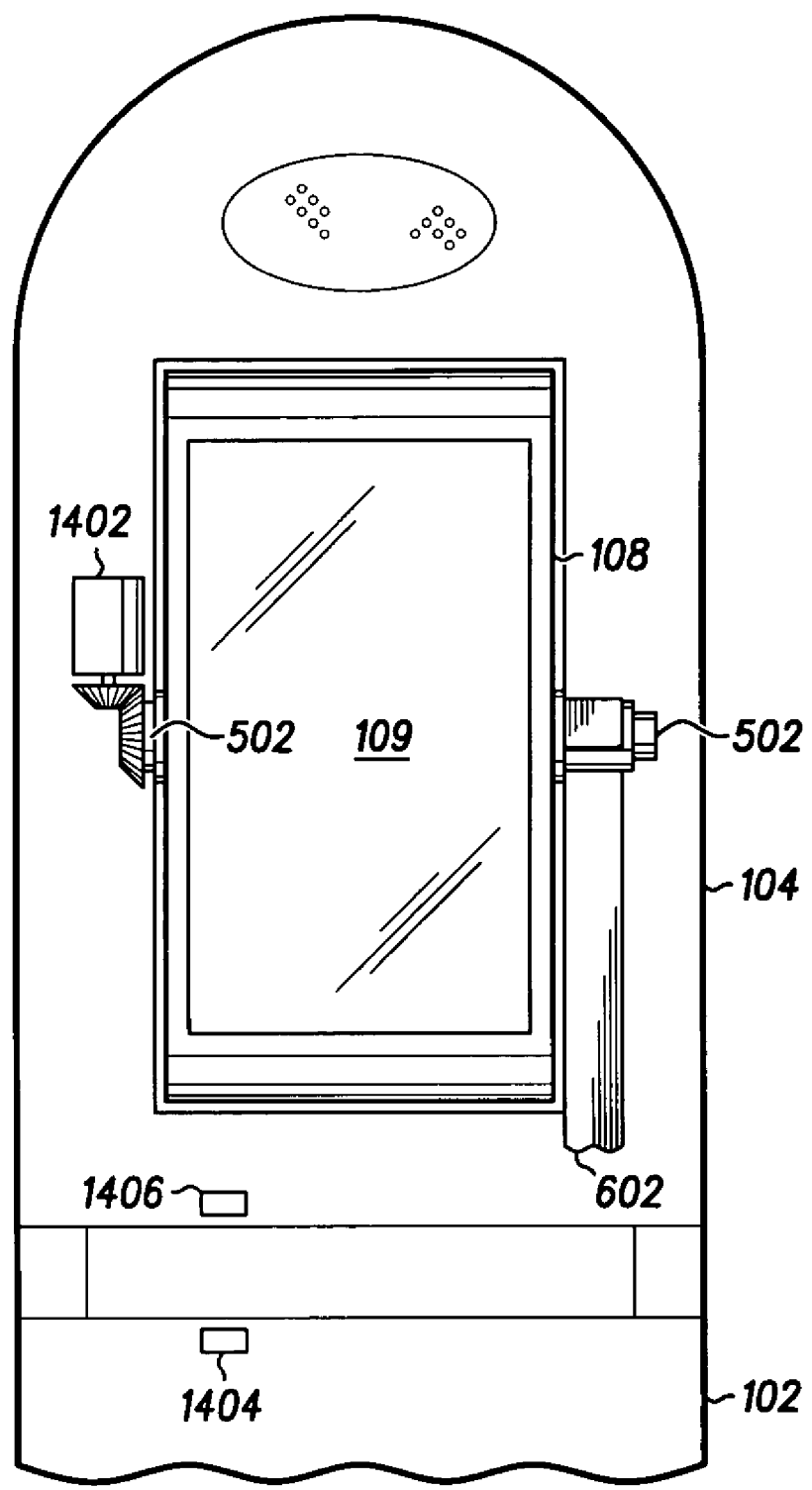
FIG. 14 shows an assembly drawing of a rotatable display module for use in a multi-configuration electronic device, in accordance with one embodiment of the invention.

Referring now to FIG. 14, there is shown an assembly drawing 1400 of a rotatable display module for use in a multi-configuration electronic device, in accordance with one embodiment of the invention. Here the display is rotated by a motor 1402 under control of a control circuit located in the device. The advantage of using the motor as shown is that no mechanical link between the first and second body portions is needed. Typically devices such as cellular phones with a folding configuration have a means for detecting the opening and closing of the phone. One of the most common ways of detecting the phone configuration is by the use of a hall effect switch 1404 disposed in one body portion, and a magnet 1406 disposed in the other body portion at a location such that in one position the hall effect switch is affected by the magnets proximity, and when the phone configuration is changed the magnet is moved away from the hall effect switch. The state of the hall effect switch is detected by a control circuit of the device, and takes action accordingly, causing the display to rotate to the appropriate position, consistent with the description of previous embodiments described herein. It is also contemplated that the motor may be disposed in the first body portion, and used to drive an axle and gear assembly or belt assembly as previously described herein.

Thus the invention provides a multi-configuration electronic device having a first body portion and a second body portion that are connected to each other such as, for example, via hinge. The device may be, for example, a personal digital assistant, cellular phone, or nay of a variety of hand held, multi-purpose electronic devices. The first body portion has a display module mounted therein for displaying information to a user of the device. It is also contemplated that the display module may also be used as an input device, wherein the display module is, for example, a touch screen display that reads tactile input, as is known in the art. The first and second body portions move relative to each other into an open and a closed position, and the device may be used in either the open or closed positions for various functions. To avoid the complexity and cost of adding a second display to the device, the display module rotates automatically so that it can be seen in either the open or closed position. In one embodiment the display module automatically rotates about a horizontal axis with respect to the first body portion. In another embodiment the display module automatically rotates about a vertical axis with respect to the first body portion. To cause the display module to rotate, one of a variety of mechanisms may be employed, as dictated by engineering discretion, such as the use of a belt linked between the first and second body portions. An advantage of using the belt mechanism is that proper position can be assured when coupled with the use of a stop feature in the first portion for preventing over rotation of the display module. The belt must be tensioned so that the belt slips once the display module is rotated into a terminal position. Alternatively, the display module may be automatically rotated by means of a gear and axle assembly linked between the first and second body portions, or a combination of a belt linked between the first and second body portions, and a gear and axle assembly.

Furthermore, it is contemplated that the invention provides a foldable mobile communication device having first and second body portions rotatably coupled together and moveable between an open position and a closed position. The first body portion having an inside surface and an outside surface. Mounted in the first body portion is a display module that is rotatable, and has a viewing surface. The display module rotates so that the viewing surface of the display module is aligned with the inside surface of the first body portion when the mobile communication device is in the open position, and the viewing surface of the display module is aligned with the outside surface of the first body portion when the mobile communication device is in the closed position. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A multi-configuration electronic device, comprising:
a first body portion having a display module, the display module rotatably mounted in the first body portion and having a viewing surface;
a second body portion hingeably connected to the first body portion;
wherein the first and second body portions move relative to each other into an open and a closed position; and
wherein the display module rotates in the first body portion automatically so that it can be seen in either the open or closed position and where the viewing surface is aligned with an outside surface of the first body portion when the first body portion is in the closed position and is aligned with an inside surface of the first body portion when the first body portion is in the open position.

2. A multi-configuration electronic device as defined in claim 1, wherein the display module automatically rotates about a horizontal axis with respect to the first body portion.

3. A multi-configuration electronic device as defined in claim 1, wherein the display module automatically rotates about a vertical axis with respect to the first body portion.

4. A multi-configuration electronic device as defined in claim 1, wherein the display module automatically rotates by means of a belt linked between the first and second body portions.

5. A multi-configuration electronic device as defined in claim 4, further comprising a stop feature for preventing over rotation of the display module, and wherein the belt slips once the display module is rotated into a terminal position.

6. A multi-configuration electronic device as defined in claim 1, wherein the display module automatically rotates by means of a gear and axle assembly linked between the first and second body portions.

7. A multi-configuration electronic device as defined in claim 1, wherein the display module automatically rotates by means of a combination of a belt linked between the first and second body portions, and a gear and axle assembly.

8. A multi-configuration electronic device as defined in claim 1, wherein the display module automatically rotates by means of a motor.

9. A foldable mobile communication device, comprising:
first and second body portions rotatably coupled together and moveable between an open position and a closed position, the first body portion having an inside surface and an outside surface; and
a display module rotatably mounted in the first body portion and having a viewing surface;
wherein the display module rotates so that the viewing surface of the display module is aligned with the inside surface of the first body portion when the mobile communication device is in the open position, and the viewing surface of the display module is aligned with the outside surface of the first body portion when the mobile communication device is in the closed position.

10. A multi-configuration electronic device as defined in claim 9, wherein the display module automatically rotates about a horizontal axis with respect to the first body portion.

11. A multi-configuration electronic device as defined in claim 9, wherein the display module automatically rotates about a vertical axis with respect to the first body portion.

12. A multi-configuration electronic device as defined in claim 9, wherein the display module automatically rotates by means of a belt linked between the first and second body portions.

13. A multi-configuration electronic device as defined in claim 12, further comprising a stop feature for preventing over rotation of the display module, and wherein the belt slips once the display module is rotated into a terminal position.

14. A multi-configuration electronic device as defined in claim 9, wherein the display module automatically rotates by means of a gear and axle assembly linked between the first and second body portions.

15. A multi-configuration electronic device as defined in claim 9, wherein the display module automatically rotates by means of a combination of a belt linked between the first and second body portions, and a gear and axle assembly.

16. A multi-configuration electronic device as defined in claim 9, wherein the display module automatically rotates by means of a motor.

* * * * *